(12) United States Patent
Moubarak et al.

(10) Patent No.: US 11,279,240 B2
(45) Date of Patent: Mar. 22, 2022

(54) TORQUE VECTORING WITH MODEL-PREDICTIVE TORQUE REQUESTS

(71) Applicant: Ford Global Technologies, LLC, Dearborn, MI (US)

(72) Inventors: Paul M. Moubarak, Blue Ash, OH (US); Weitian Chen, Windsor (CA); Jonathan Sullivan, Ferndale, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 16/513,415

(22) Filed: Jul. 16, 2019

(65) Prior Publication Data

US 2021/0016667 A1 Jan. 21, 2021

(51) Int. Cl.
| | | |
|---|---|---|
| *B60L 15/20* | (2006.01) | |
| *B60K 17/04* | (2006.01) | |
| *B60W 30/045* | (2012.01) | |
| *B60K 23/04* | (2006.01) | |
| *B60L 15/02* | (2006.01) | |
| *B60K 1/00* | (2006.01) | |

(52) U.S. Cl.
CPC ............ *B60L 15/20* (2013.01); *B60K 17/046* (2013.01); *B60K 23/04* (2013.01); *B60L 15/025* (2013.01); *B60W 30/045* (2013.01); *B60K 2001/001* (2013.01)

(58) Field of Classification Search
CPC .. B60L 15/20; B60L 15/025; B60L 2240/423; B60K 17/046; B60K 2001/001; B60K 23/04; B60W 30/045
See application file for complete search history.

(56) References Cited

U.S. PATENT DOCUMENTS

| | | | |
|---|---|---|---|
| 7,164,247 | B2 | 1/2007 | Joe et al. |
| 8,056,417 | B2 | 11/2011 | Markunas et al. |
| 9,278,681 | B2 | 3/2016 | Liang et al. |
| 9,610,973 | B2 | 4/2017 | Tagami et al. |
| 2007/0225887 | A1 | 9/2007 | Morris |

(Continued)

OTHER PUBLICATIONS

Jalali et al.; Integrated stability and traction control for electric vehicles using model predictive control; Control Engineering Practice 54; (2016) p. 256-266; Elsevier (Year: 2016).*

(Continued)

*Primary Examiner* — Michael J Zanelli
(74) *Attorney, Agent, or Firm* — David B. Kelley; Brooks Kushman P.C.

(57) ABSTRACT

A vehicle electric torque vectoring system includes a traction motor, a vectoring motor, gears, and a controller. The gears transfer torque from the propulsion and vectoring motors to wheels. The controller, responsive to a step change in an unmodified torque request for the vectoring motor and a predicted torque response of the vectoring motor being greater than the unmodified torque request, commands the vectoring motor to generate torque with a modified torque request less than the unmodified torque request. The controller further, responsive to the predicted torque response becoming less than the unmodified torque request, commands the vectoring motor to generate torque with the unmodified torque request.

17 Claims, 3 Drawing Sheets

(56) References Cited

U.S. PATENT DOCUMENTS

2010/0087996 A1     4/2010   Haggerty et al.
2011/0178662 A1     7/2011   Sime et al.

OTHER PUBLICATIONS

Hrovat et al.; The Development of Model Predictive Control in Automotive Industry: A Survey; 2012 IEEE Intl. Conf. on Control Applications; Oct. 3-5, 2012; Dubrovnik, Croatia (Year: 2012).*

* cited by examiner

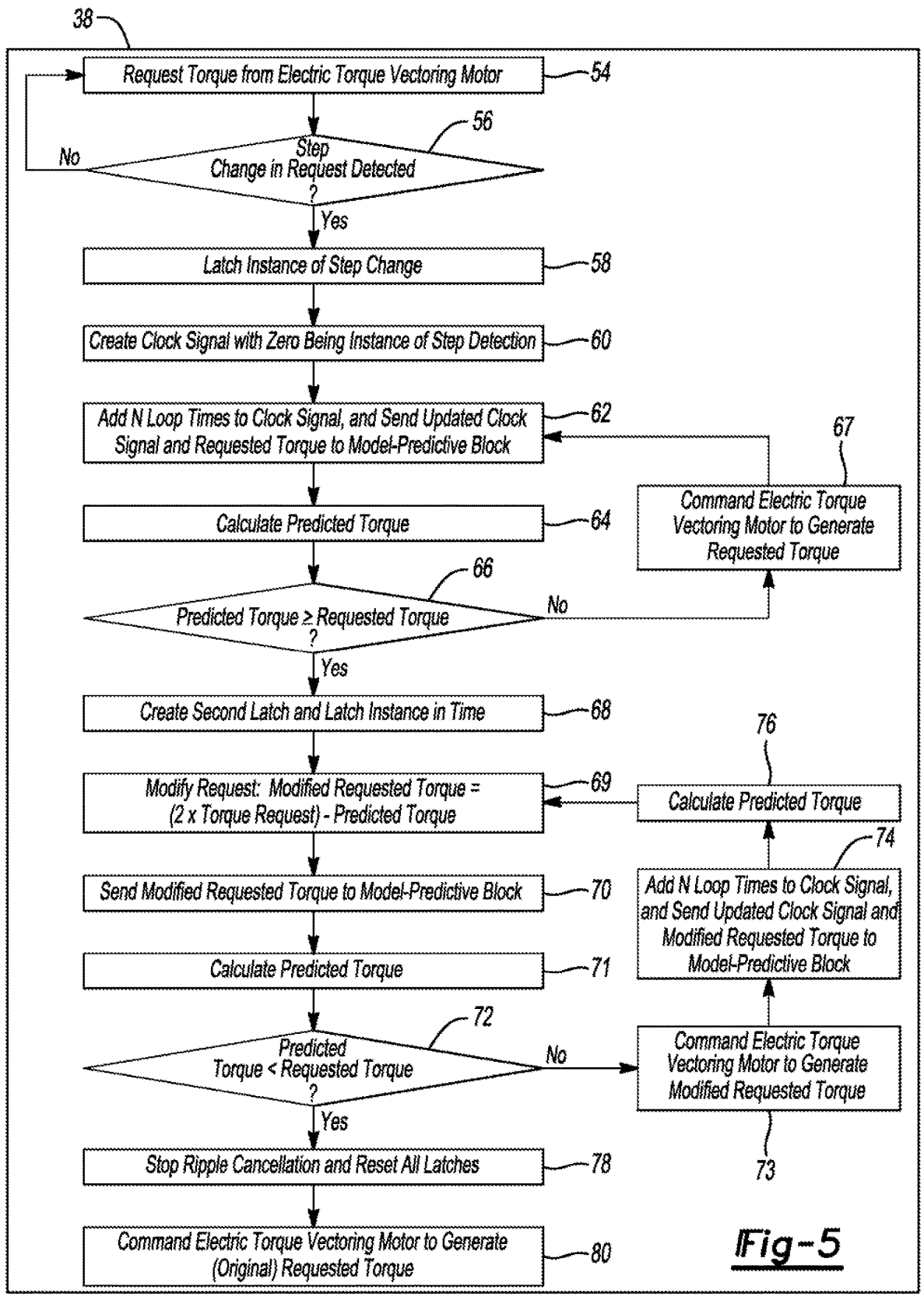

TORQUE VECTORING WITH MODEL-PREDICTIVE TORQUE REQUESTS

TECHNICAL FIELD

This disclosure relates to vehicle drivetrain control.

BACKGROUND

Torque vectoring can be used to improve vehicle cornering and stability. Fundamentally, torque vectoring systems redistribute torque between driven wheels. When cornering, for example, such a system could send more torque to a wheel on an outside of a corner. This additional "push" from the outside wheel generates a yaw moment that helps turn into the corner, tightening the line.

SUMMARY

A vehicle electric torque vectoring system includes a traction motor, a vectoring motor, gears configured to transfer torque from the propulsion and vectoring motors to wheels, and a controller. The controller, responsive to a step change in an unmodified torque request for the vectoring motor and a predicted torque response of the vectoring motor being greater than the unmodified torque request, commands the vectoring motor to generate torque with a modified torque request less than the unmodified torque request. The controller further, responsive to the predicted torque response becoming less than the unmodified torque request, commands the vectoring motor to generate torque with the unmodified torque request.

A method for controlling a vehicle electric torque vectoring system includes, responsive to a step change in an unmodified torque request for a vectoring motor configured to generate torque for wheels in tandem with a traction motor and a predicted torque response of the vectoring motor being greater than the unmodified torque request, commanding by a controller the vectoring motor to generate torque with a modified torque request until the predicted torque response becomes less than the unmodified torque request. The modified torque request has a magnitude that is less than the unmodified torque request and that sequentially increases, decreases, and then increases.

A vehicle includes wheels, traction and vectoring motors each configured to generate torque for the wheels, and a controller. The controller, responsive to a step change in an unmodified torque request for the vectoring motor and a predicted torque response of the vectoring motor being greater than the unmodified torque request, commands the vectoring motor to generate torque with a modified torque request until the predicted torque response becomes less than the unmodified torque request. The modified torque request has a magnitude that is less than the unmodified torque request and that sequentially increases, decreases, and then increases. The controller further, responsive to the predicted torque response becoming less than the unmodified torque request, commands the vectoring motor to generate torque with the unmodified torque request.

BRIEF DESCRIPTION OF THE DRAWINGS

FIG. 5 is a flow chart of an algorithm implementing model-predictive control.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Electric torque vectoring systems bias torque side to side to induce a moment on the vehicle and help it turn in the direction of steer. There are a number of ways to accomplish electric torque vectoring. One such way is super-positioning in which torque from a large propulsion motor is superimposed on the torque from a small vectoring motor through a set of planetary gears.

Figure 1:
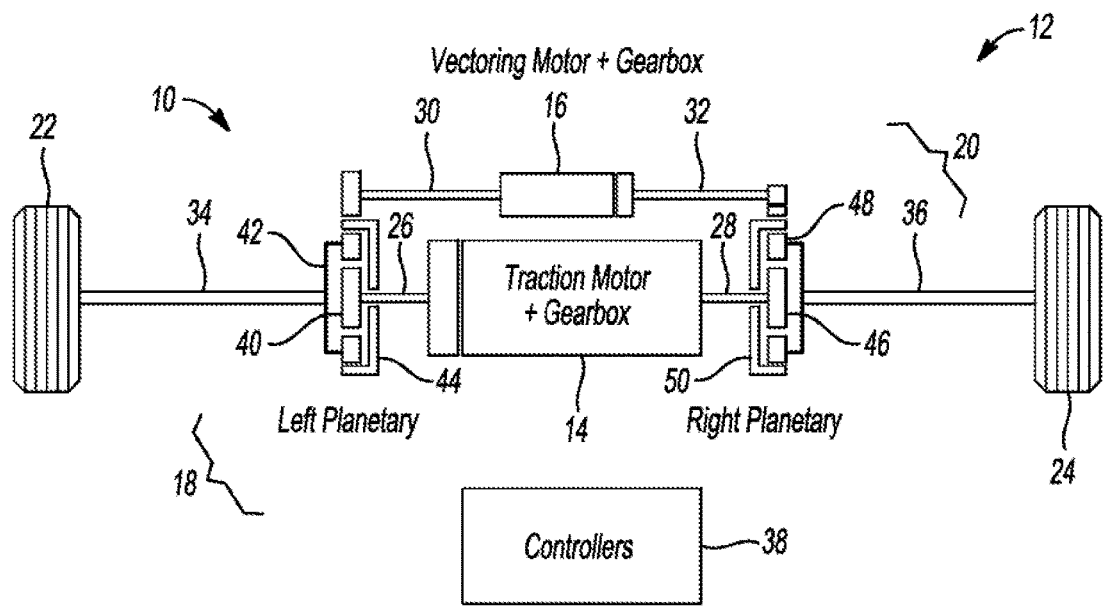
FIG. 1 is a block diagram of a vehicle electric torque vectoring system.

FIG. 1 shows an example of an electric torque vectoring system 10 of a vehicle 12. The electric torque vectoring system 10 includes a traction motor and gearbox 14, a vectoring motor and gearbox 16, planetary gear sets 18, 20, wheel/tire assemblies 22, 24, shafts 26, 28, 30, 32, 34, 36, and one or more controllers 38. The controllers 38 are in communication with/control the traction motor and gearbox 14 and vectoring motor and gearbox 16, and may implement the algorithms contemplated herein.

The planetary gearset 18 includes a sun gear 40, a carrier and planet gears 42, and a ring gear 44. Likewise, the planetary gearset 20 includes a sun gear 46, a carrier and planet gears 48, and a ring gear 50. The shaft 26 mechanically couples the traction motor and gearbox 14 with the sun gear 40. The shaft 30 mechanically couples the vectoring motor and gearbox 14 with the ring gear 44. The shaft 34 mechanically couples the wheel/tire assembly 22 with the carrier and planet gears 42. Likewise, the shaft 28 mechanically couples the traction motor and gearbox 14 with the sun gear 46. The shaft 32 mechanically couples the vectoring motor and gearbox 16 with the ring gear 50. The shaft 36 mechanically couples the wheel/tire assembly 24 with the carrier and planet gears 48.

In this arrangement, the vectoring motor and gearbox 16 act on the speed difference between the wheel/tire assemblies 22, 24, not the speed of the vehicle 12. This means that the power required for the motor 16 is relatively small, but the torque needed at the wheel/tire assemblies 22, 24 for any noticeable vectoring yaw can be upwards of 1,000 Nm. As a result, the gearbox 16 can be relatively large.

Figure 2:
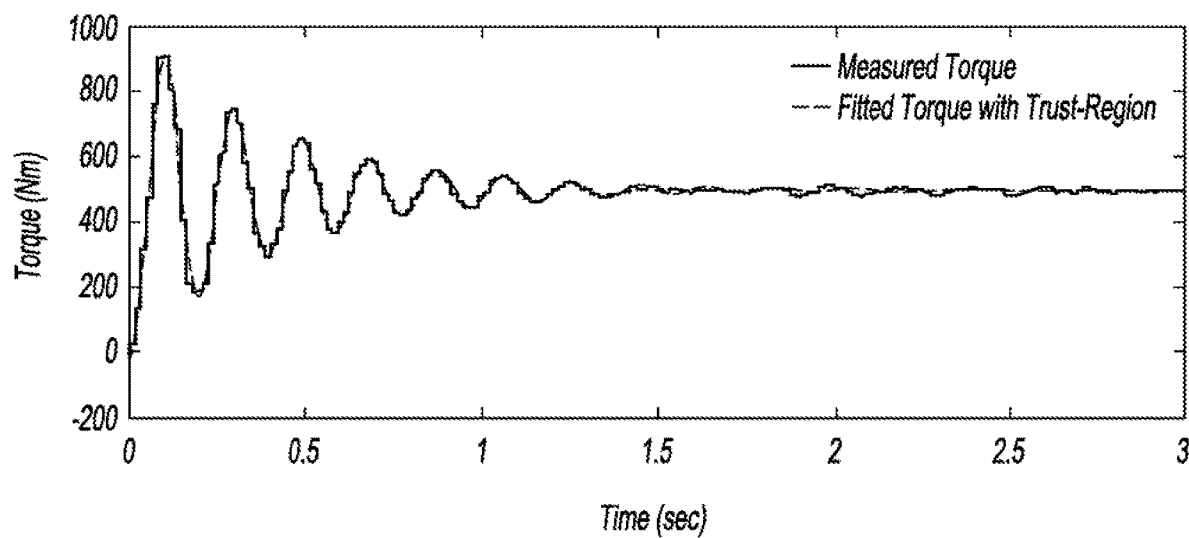
FIG. 2 is a plot of measured and filtered torques versus time.

Given this architecture, a small inertia (the motor 16) is connected to torsional springs (the shafts 30, 32) through a large gear reduction (the gearbox 16). This can make the system behave like a mass-spring-damper system with resonance behaviors and a tendency to exhibit large torque oscillations, especially if a sudden increase in torque is required such as with a step function. FIG. 2 shows vehicle measurements (measured torque) of such a system having a torque overshoot on the first peak with a magnitude almost twice as large as the initial request.

Here, a model-predictive approach is proposed that corrects the torque request to negate the effect of the predicted oscillations that will happen two to three loop times in the future. The reason for proposing a model-predictive solution and not a more traditional feedback solutions is because of the time delay when propagating sensor data on a car area network. This delay can be upwards of two loop times (e.g., 32 ms). This means that any form of feedback control will be attempting to correct an event that may have already happened. Thus, the need for a model-predictive control approach arises for circumstances in which the magnitude of torque oscillation is predicted two to three loops in the future based on a current torque request. By anticipating the magnitude of the oscillations at any given time in the future, the current torque request is corrected in order to offset the anticipated oscillation that will happen in the future.

There are several ways to create a model capable of predicting the behavior described above. For this torque vectoring example, analysis has shown that the system response has a relatively constant natural frequency around 6 Hz. Furthermore, by modeling the torque vectoring branch from the motor 16 to the wheel/tire assemblies 22, 24, it is apparent that the system behaves like a sixth order system with two real poles and four imaginary poles. If left/right vehicle symmetry is assumed, the time response of the system can be simplified to a third order system with one real dominant pole and two imaginary dominant poles. As such, the time response for a give torque step can be modeled with the following generic expression:

$$T(t) = \rho_{TV} T_{TV,cmd} + c_1 e^{-\gamma_1 t} + c_2 \cos(\omega_1 t) e^{-\gamma_2 t} + c_3 \sin(\omega_1 t) e^{-\gamma_2 t} \quad (1)$$

where T(t) is the torque response (predicted torque) as a function of time t, $T_{tv,cmd}$ is the requested torque, $\rho_{TV}$ is the ratio of the gearbox 16, and $c_1$, $c_2$, $c_3$, $\gamma_1$, $\gamma_2$, and $\omega_1$ are system-dependent parameters that need to be identified using known techniques. One way to identify these parameters is by measuring a torque trace as a function of time in a vehicle for a given known request, and then using a known trust-region minimization algorithm to ft the expression for T(t) to the measured trace as shown in FIG. 2. By doing so, the known trust region algorithm will calculate the parameters $c_1$, $c_2$, $c_3$, $\gamma_1$, $\gamma_2$, and $\omega_1$ such that the root mean square error is minimized.

A possible drawback of the trust-region fitting algorithm is that the goodness of the solution as defined by the root mean square error depends on an initial guess for the parameters $c_1$, $c_2$, $c_3$, $\gamma_1$, $\gamma_2$, and $\omega_1$. That is, there could exist multiple local solutions that will provide a good fit but only one global solution that yields the best fit with a root mean square error close to zero. Since it is desirable to have the system predict the torque response for any given step request from 0-1200 Nm for example, either the global solution is required, or multiple fits should be identified at different torque levels to create a map of the system response for interpolation purposes. One can record, for example, torque traces for a 100 Nm request, a 300 Nm request, a 500 Nm request, a 700 Nm request, a 900 Nm request, and a 1100 Nm request, and then fit T(t) to each of the traces to create a map with $T_{100}(t)$, $T_{300}(t)$, $T_{500}(t)$, $T_{700}(t)$, $T_{900}(t)$, and $T_{1100}(t)$. A standard interpolator can then be used to calculate a response of the system that falls between two consecutive traces.

Figure 3:
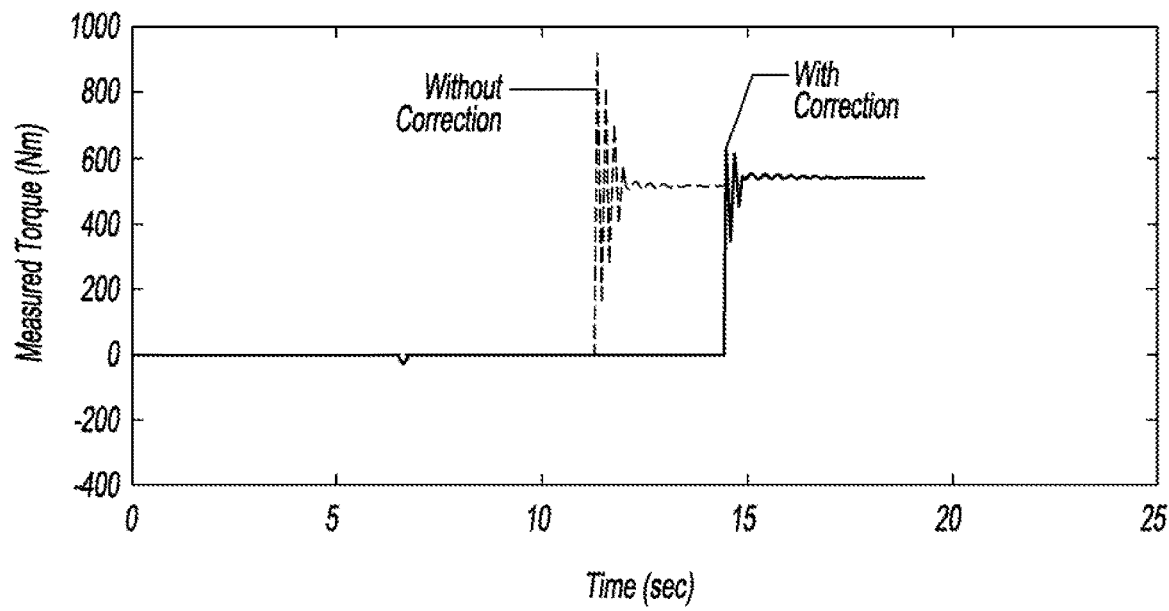
FIG. 3 is a plot of measured torque versus time with and without model-predictive control active.

The results of such an example method are shown in FIG. 3. When the model-predictive feature is turned OFF, the torque measured at the vehicle half-shafts for a 500 Nm request reveals an oscillation with a first peak near 1000 Nm. When the model-predictive feature is turned ON, the measured response of the system shows a significant attenuation in the torque ripple. This attenuation can be further tuned to achieve optimal results.

Figure 4:
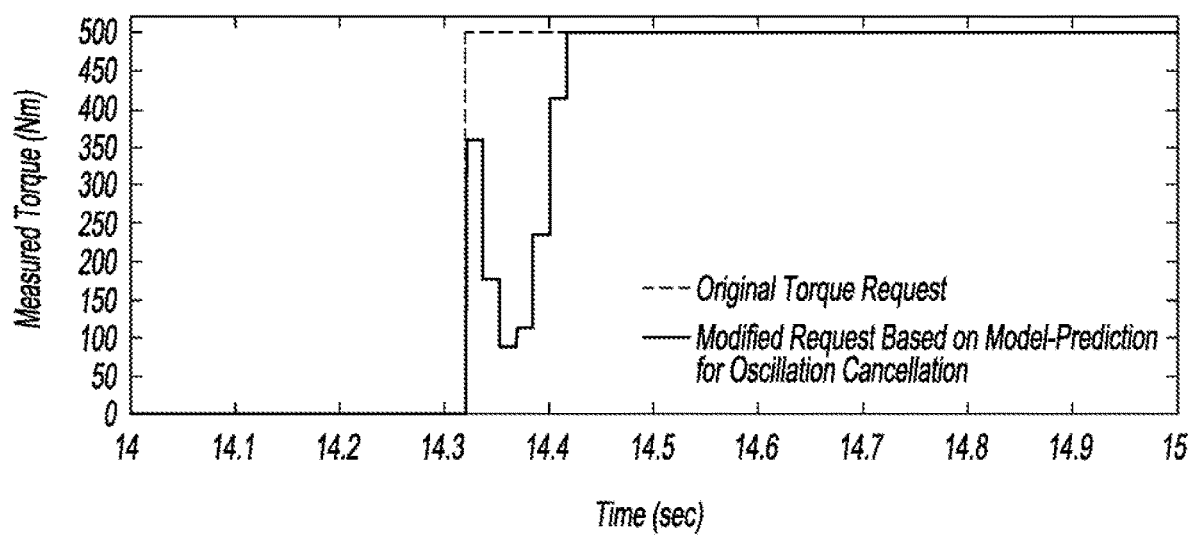
FIG. 4 is a plot of torque requests versus time with and without model-predictive control active.

With reference to FIG. 4, corresponding to this attenuation in torque ripples is a change in the torque request which is iteratively modified based on the predicted response of the system two loops into the future. In this example, the modified requests form an increasing-decreasing-increasing stair-step time profile before achieving the original requested value. That is in this example, a magnitude of the modified requests sequentially increase, decrease, and then increase. This is in contrast to when the model-predictive feature is turned OFF in which the request represents a pure step function from 0 to 500 Nm. Note that in this method, only the first peak needs to be cancelled since once this peak is attenuated, very little ripple energy will be left in the system.

The flow chart of FIG. 5 shows that, at operation 54, torque is requested from an electric torque vectoring motor. If a step change in the request is not detected at decision block 56, the algorithm returns to operation 54. Otherwise, the algorithm proceeds to operation 58. At operation 58, the instance of the step change is latched. A clock signal is created with zero being the instance of step detection at operation 60. At operation 62, N loop times (e.g., 2 loop times) are added to the clock signal, and the updated clock signal and requested torque are sent to the model-predictive algorithm. At operation 64, a predicted torque is calculated by the model-predictive algorithm. If the predicted torque is less than the requested torque at decision block 66, the electric torque vectoring motor is commanded to generate the requested torque at operation 67 and the algorithm returns to operation 62.

If the algorithm returns to operation 62 a predetermined number of times, e.g., 4, or iteratively performs operations 62, 64, 66, 67 for longer than a predetermined duration of time, e.g., 200 milliseconds, the algorithm may proceed to operation 78. Otherwise, the algorithm proceeds to operation 68.

At operation 68, the instance is latched. At operation 69, the request is modified according to the relation Modified Requested Torque=(2×Torque Request)−Predicted Torque The modified requested torque is sent to the model-predictive algorithm at operation 70. At operation 71, a predicted torque is calculated by the model-predictive algorithm. If this new predicted torque is greater than the requested torque at decision block 72, the electric torque vectoring motor is commanded to generate the modified requested torque at operation 73 and the algorithm proceeds to operation 74. Otherwise, the algorithm proceeds to operation 78. At operation 74, N loop times are added to the clock signal, and the updated clock signal and modified requested torque are sent to the model-predictive algorithm. At operation 76, a predicted torque is calculated by the model-predictive algorithm. The algorithm then proceeds to operation 69.

At operation 78, the ripple cancellation is stopped, and all latches are reset. At operation 80, the electric torque vectoring motor is commanded to generate the (original) requested torque.

The algorithms, processes, methods, logic, or strategies disclosed may be deliverable to and/or implemented by a processing device, controller, or computer, which may include any existing programmable electronic control unit or dedicated electronic control unit. Similarly, the algorithms, processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The algorithms, processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle electric torque vectoring system comprising:
a traction motor;
a vectoring motor;
gears configured to transfer torque from the traction and vectoring motors to wheels; and
a controller programmed to,
responsive to a step change in an unmodified torque request for the vectoring motor and a predicted torque response of the vectoring motor being greater than the unmodified torque request, command the vectoring motor to generate torque with a modified torque request less than the unmodified torque request, and
responsive to the predicted torque response becoming less than the unmodified torque request, command the vectoring motor to generate torque with the unmodified torque request.

2. The vehicle electric torque vectoring system of claim 1, wherein the controller is further programmed to, responsive to the step change in the unmodified torque request and the predicted torque response being less than the unmodified torque request, command the vectoring motor to generate torque with the unmodified torque request.

3. The vehicle electric torque vectoring system of claim 1, wherein the modified torque request has a magnitude that changes over time.

4. The vehicle electric torque vectoring system of claim 3, wherein the magnitude increases, decreases, and then increases.

5. The vehicle electric torque vectoring system of claim 1, wherein the modified torque request is based on the predicted torque response.

6. The vehicle electric torque vectoring system of claim 1, wherein the gears include planetary gear sets.

7. The vehicle electric torque vectoring system of claim 6, wherein the planetary gear sets include planet gears mechanically coupled with the wheels via shafts.

8. A method for controlling a vehicle electric torque vectoring system, comprising:
responsive to a step change in an unmodified torque request for a vectoring motor configured to generate torque for wheels in tandem with a traction motor and a predicted torque response of the vectoring motor being greater than the unmodified torque request, commanding by a controller the vectoring motor to generate torque with a modified torque request until the predicted torque response becomes less than the unmodified torque request, the modified torque request having a magnitude that is less than the unmodified torque request and that sequentially increases, decreases, and then increases.

9. The method of claim 8 further comprising, responsive to the predicted torque response becoming less than the unmodified torque request, commanding by the controller the vectoring motor to generate torque with the unmodified torque request.

10. The method of claim 8 further comprising, responsive to a step change in the unmodified torque request and the predicted torque response being less than the unmodified torque request, commanding by the controller the vectoring motor to generate torque with the unmodified torque request.

11. The method of claim 8, wherein the modified torque request is based on the predicted torque response.

12. A vehicle comprising:
wheels;
traction and vectoring motors each configured to generate torque for the wheels; and
a controller programmed to,
responsive to a step change in an unmodified torque request for the vectoring motor and a predicted torque response of the vectoring motor being greater than the unmodified torque request, command the vectoring motor to generate torque with a modified torque request until the predicted torque response becomes less than the unmodified torque request, the modified torque request having a magnitude that is less than the unmodified torque request and that sequentially increases, decreases, and then increases, and
responsive to the predicted torque response becoming less than the unmodified torque request, command the vectoring motor to generate torque with the unmodified torque request.

13. The vehicle of claim 12, wherein the controller is further programmed to, responsive to the step change in the unmodified torque request and the predicted torque response being less than the unmodified torque request, command the vectoring motor to generate torque with the unmodified torque request.

14. The vehicle of claim 12, wherein the modified torque request is based on the predicted torque response.

15. The vehicle of claim 12 further comprising gears configured to transfer torque from the traction and vectoring motors to the wheels.

16. The vehicle of claim 15, wherein the gears include planetary gear sets.

17. The vehicle of claim 16, wherein the planetary gear sets include planet gears mechanically coupled with the wheels via shafts.

* * * * *